(12) United States Patent
Suzuki (10) Patent No.: US 9,485,386 B2
(45) Date of Patent: Nov. 1, 2016

(54) METHOD FOR CREATING SCANNER PROFILE, METHOD FOR CREATING DEVICE PROFILE, METHOD FOR ACQUIRING COLOR VALUE, IMAGE READING SYSTEM, AND IMAGE FORMING APPARATUS

(71) Applicant: KONICA MINOLTA, INC., Chiyoda-ku, Tokyo (JP)

(72) Inventor: Naoyo Suzuki, Tama (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/725,757

(22) Filed: May 29, 2015

(65) Prior Publication Data

US 2015/0350484 A1    Dec. 3, 2015

(30) Foreign Application Priority Data

May 30, 2014    (JP) ................................. 2014-113213

(51) Int. Cl.
*H04N 1/04* (2006.01)
*H04N 1/23* (2006.01)
*H04N 1/00* (2006.01)
*H04N 1/38* (2006.01)

(52) U.S. Cl.
CPC ........ *H04N 1/2338* (2013.01); *H04N 1/00045* (2013.01); *H04N 1/38* (2013.01)

(58) Field of Classification Search
CPC ... H04N 1/2338; H04N 1/00045; H04N 1/38
USPC .................................. 358/518, 1.9, 474, 505
See application file for complete search history.

(56) References Cited

U.S. PATENT DOCUMENTS

2005/0281459 A1* 12/2005 Bala ..................... H04N 1/6022
                                                                    382/162

FOREIGN PATENT DOCUMENTS

JP        2008-312117 A    12/2008

* cited by examiner

*Primary Examiner* — Houshang Safaipour
(74) *Attorney, Agent, or Firm* — Buchanan Ingersoll & Rooney PC (57) ABSTRACT

A method for creating a scanner profile according to the present invention includes the steps of: by reading, by a scanner, a printed material of chart image data comprising a plurality of patches which are composed of C, M, Y, K values and differentiated in color and density from each other, acquiring a first color value for the patches; acquiring a K value for the patches of the chart image data; acquiring a second color value for the patches by color-measuring the printed material by the colorimeter; and creating a scanner profile describing a relationship of the second color value to the first color value and the K value, based on the acquired first color value, K value, and second color value for each of the plurality of patches.

8 Claims, 9 Drawing Sheets

WAVELENGTH (nm)

FIG.10

WAVELENGTH (nm)

FIG.11A

B=70
(CMYK1(40, 35, 35, 0))
S1=S2

FIG.11B

B=70
(CMYK2(0, 0, 0, 50))
S1=S2

FIG.11C

Z=25
CMYK1(40, 35, 35, 0)

FIG.11D

Z=28
CMYK2(0, 0, 0, 50)
S3≠S4

METHOD FOR CREATING SCANNER PROFILE, METHOD FOR CREATING DEVICE PROFILE, METHOD FOR ACQUIRING COLOR VALUE, IMAGE READING SYSTEM, AND IMAGE FORMING APPARATUS

CROSS-REFERENCE TO RELATED APPLICATION

This application is based on Japanese Patent Application No. 2014-113213 filed on May 30, 2014, the contents of which are incorporated herein by reference.

BACKGROUND

1. Technical Field

The present invention relates to a method for acquiring a color value of a device-independent color space such as CIE XYZ using a scanner that outputs a color value of a device-dependent color space such as R, G, B.

2. Description of Related Arts

In recent years, there has been an increasing demand for color print in the field of production print. Further, highly precise color reproducibility is required of production print, and in most cases an enhanced color calibration is needed to meet the requirement. Meanwhile, it has been desired that the calibration be able to be conducted in a short time without the need for high-level knowledge.

As a method for conducting the calibration in a short time, it is conceivable to acquire a color value of a device-independent color space (standard color space) using a scanner equipped with a printer system such as disclosed in Patent Document 1 (Japanese Unexamined Patent Application Publication No. 2008-312117), for example.

In the Patent Document 1, for example, RGB data read by a scanner using a look-up table is converted to a color value of a device-independent color space, which is not dependent on the device. With regard to look-up table for converting from the read RGB, which is used for the conversion, to L*a*b*, an optimization is carried out based on the scanner device RGB data acquired by reading the profile creation chart and the colorimetric value (L*a*b*) of each color chart.

Further, in the Patent Document 1, it is attempted to solve, by adjusting the elements of the look-up table so as to decrease the chroma, such a problem (multi-to-one) that when color charts are read which are different in manuscript class such as printed manuscript and silver halide photography manuscript, the color charts are read as a plurality of different RGB data values at the scanner, due to scanner metamerism, even though the colorimetric values for the color chart read by the colorimeter are the same.

However, it is not necessarily possible to get a highly precise result of color measurement merely by optimizing the look-up table for converting from the read RGB to L*a*b*, based on the colorimetric values (L*a*b*) for the color charts, as disclosed in the Patent Document 1.

In particular, the Patent Document 1 does not recognize such a problem (one-to-multi) that when same-color patches in a color chart are formed of different K plate amounts, the patches are read as the same RGB data at the scanner while the colorimetric values from the colorimeter are not necessarily the same. Nor does the document refer to means for solving the problem.

The present invention has been made in view of the foregoing circumstances and has for an object to provide a scanner profile that makes it possible to achieve a highly accurate color conversion even if and when the scanner reads different colors as the same RGB data (one-to-multi).

SUMMARY

The foregoing object of the present invention can be achieved by means such as described below.

A method for creating a scanner profile using a scanner that reads an image to acquire a first color value of a device-dependent color space and a colorimeter that color-measures the image to acquire a second color value of a device-independent color space, the method comprising the steps of:

by reading, by the scanner, a printed material of chart image data including a plurality of patches which are composed of C, M, Y, K values and differentiated in color and density from each other, acquiring a first color value for the patches;

acquiring a K value for the patches of the chart image data;

acquiring a second color value for the patches by color-measuring the printed material by the colorimeter; and creating a scanner profile describing a relationship of the second color value to the first color value and the K value based on the acquired first color value, K value and second color value for each of the plurality of patches.

BRIEF DESCRIPTION OF THE DRAWINGS

FIGS. 11A-11D are enlarged views in which FIGS. 9 and 10 are superposed;

DETAILED DESCRIPTION

Embodiments of the present invention will now be described with reference to the accompanying drawings. Meanwhile, in the drawings and the specification of this application, like elements are denoted by like reference numerals, and an overlapping description is omitted. Further, in the drawings, for purposes of convenience of description, the size ratio is exaggerated, and may sometimes be different from the actual ratio.

Figure 1:
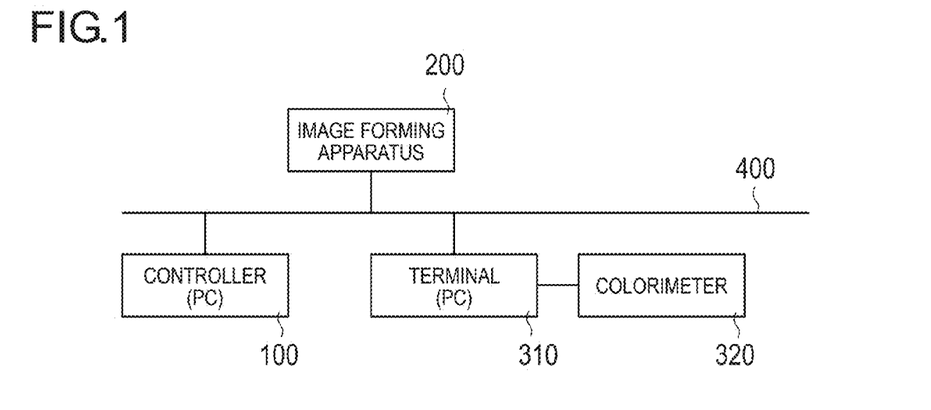
FIG. 1 is a block diagram illustrating the configuration of a printing system.
Figure 2:
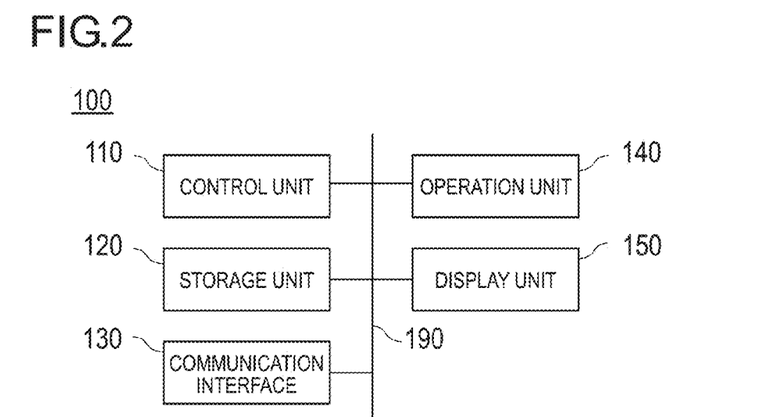
FIG. 2 is a block diagram illustrating the configuration of a controller 100.
Figure 3:
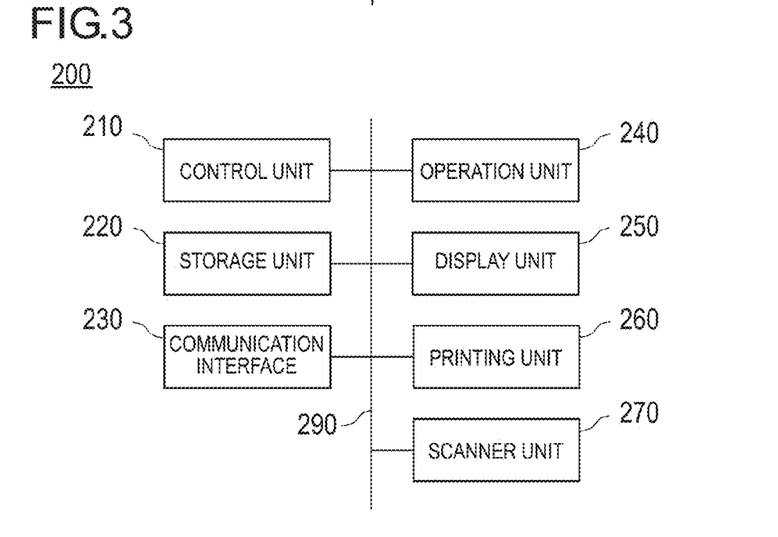
FIG. 3 is a block diagram illustrating the configuration of an image forming apparatus 200.

FIGS. 1-3 are block diagrams illustrating the configuration of the printing system according to an embodiment of the present invention. As illustrated in FIG. 1, the printing system includes a controller 100, which may be comprised of a PC (personal computer), and an image forming apparatus 200, wherein the controller 100 and the image forming apparatus 200 are communicatively connected to each other via a network 400. Further, a terminal 310, which may be comprised of a PC or the like, is connected to the network 400, and a colorimeter 320 is locally connected to the terminal 310, such as based on the USB standard.

As illustrated in FIG. 2, the controller 100 includes: a control unit 110, which may include a CPU, RAM or the like; a storage unit 120, which may be comprised of a semiconductor memory (ROM, SSD, or the like) or a hard disc (HDD); a communication interface 130 that communicates with a variety of terminals, which may be connected to the network 400; an operation unit 140, which may be comprised of a mouse, keyboard, or a touch sensor superposed on a touch panel; and a display unit 150, which may be comprised of a liquid crystal display. These units are connected to each other via a signal line 190 such as a bus.

As shown in FIG. 3, the image forming apparatus 200 includes a control unit 210, a storage unit 220, a communication interface 230, an operation unit 240, a display unit 250, a printing unit 260, a scanner unit 270, and a signal line 290. The configuration, except for the printing unit 260 and scanner unit 270, is similar to that of the controller 100, and a description thereof will be omitted.

The printing unit 260 includes a developing unit, which contains color materials such as color toners or color inks of four colors, i.e., C, M, Y, and K, and is configured to form a full-color image on a sheet in accordance, with color signals of CMYK.

[Scanner Unit 270]

The scanner unit 270 performs a color measurement by irradiating uniform light from a light source (lamp) to a manuscript and focusing reflected light on a line-like sensor through a light receiving lens. The sensor, which may be comprised of CCD, CMOS or the like, is covered with three types of (R, G, B) filters, and outputs a color value of RGB corresponding to the filter type. The R, G, B color values are color values (first color value) of a device-dependent color space that depends on the characteristics of the scanner unit 270 unlike a color value of a device-independent color space, which is acquired from the colorimeter 320.

The scanner unit 270 is located in a sheet conveyance path downstream of the printing unit 260, and is capable of reading a sheet being conveyed on which an image has been formed by the printing unit 260. The control unit 210 knows of the position information of a patch image or other image formed on the sheet by analyzing print data for use as an original for forming the image at the printing unit 260. Based on the acquired position information of the patch image, it is possible to achieve a mapping between the R, G, B color values acquired by reading the image of each patch and the K-value for the image data of the pertinent patch.

[Colorimeter 320]

The colorimeter 320 shown in FIG. 1, which is also referred to as spectrophotometer, measures reflected light from a surface of an object to be measured and thus acquires a spectral distribution of the surface within the visible light range or within the near infrared to near ultraviolet wavelength range. It also outputs a color value (coloration value) of a device-independent color space as an output other than the spectral distribution. For the color value (second color value) of the device-independent color space, there are CIE XYZ and CIE Lab (hereinafter described as L*a*b*).

Among specific examples of the colorimeter are FD7 (manufactured by KONICA MINOLTA, Inc.) and i1iSis (manufactured by X-Rite, Inc.), which allow for acquisition of spectral data within the wavelength range from 380 nm to 730 nm or the color values for CIE XYZ and L*a*b* under the D50 light source or various other standard light sources.

Further, the terminal 310 has stored therein a control program that operates when a color measurement is conducted at the colorimeter 320. Color chart (chart including a plurality of patch groups) such as image data printed on a printed material, e.g., chart image data D1 (hereinafter described with reference to FIGS. 4 and 5A) is registered in the control program as well. Mapping of each patch to its colorimetric value can be achieved by the user conducting a color measurement for each patch image in accordance with the procedure specified by the control program. Meanwhile, if the colorimeter 320 is equipped with a sheet feed mechanism that conveys a sheet-like printed material to the colorimeter 320, it may be configured such that the control program automatically performs mapping of each patch to its colorimetric value in accordance with the procedure mentioned below. First, the image on the entire surface of the printed material is read while conveying the printed material by the sheet feed mechanism (color measurement). Subsequently, register marks are located at predetermined positions such as the four corners or both sides of the printed material so that the position information of each patch image is obtained based on the relative positions between the register marks and the respective patches through image recognition of the register marks and the respective patch images. Finally, mapping of each patch to its colorimetric value is performed based on the position information.

Figure 4:
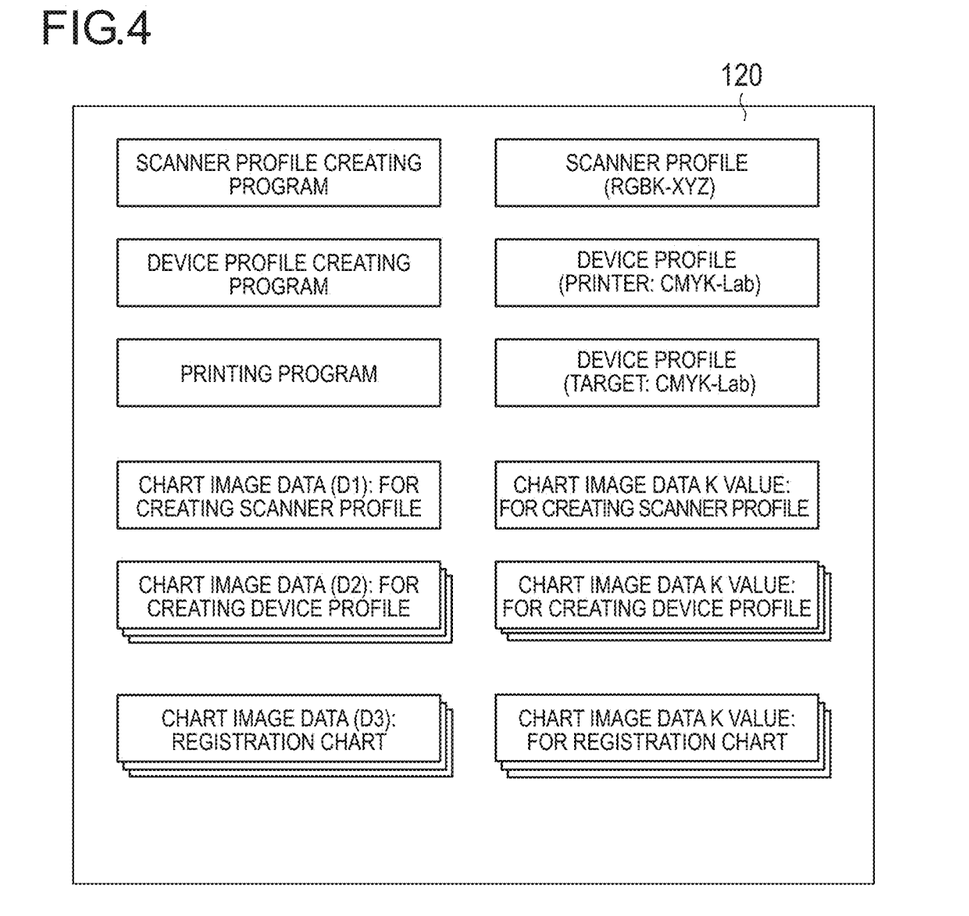
FIG. 4 is a schematic diagram for explaining data stored in a storage unit 120.

FIG. 4 is a schematic diagram for explaining data stored in the storage unit 120 of the controller 100. In the storage unit 120 are stored a scanner profile creating program, a device profile creating program, and a printing program. These programs are developed to the RAM of the control unit 110 or the like, and executed through cooperation with the CPU. The printing program has the functions of converting a document file created using a word processor software or the like, an image file such as TIF or EPS (Encapsulated Post Script) form, or a PDF form file to print data in a Page Description Language (PDL) such as PS, PCL or the like, and transmitting the print data to the image forming apparatus together with the print setting selected by the user. The contents of the programs other than the printing program will be described based on a control flow chart hereinafter.

Further, the following data are pre-stored as image data: (1) chart image data for creating a scanner profile; (2) chart image data for creating a printer profile: (3) chart image data for creating a device profile of target device; and (4) registration chart image data for adjusting the printing unit 260. These chart image data are image data which are composed of CMYK color signals.

Figure 5A:
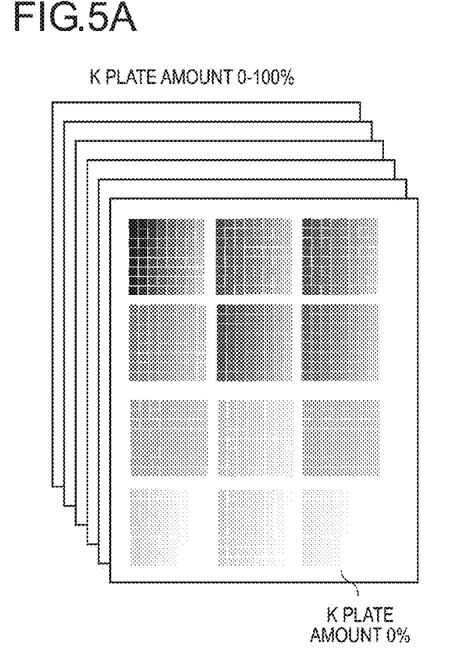
FIGS. 5A and 5B are imaginary views for explaining the contents of chart image data.
Figure 5B:
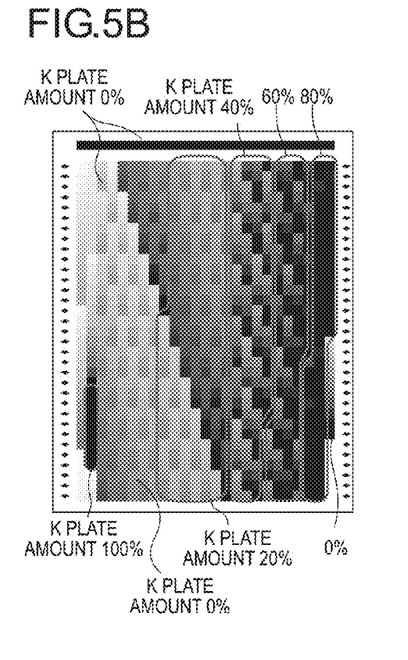

FIGS. 5A and 5B are imaginary views for explaining the contents of the chart image data. More specifically, FIGS. 5A and 5B illustrate the chart image data for creating the scanner profile and the chart image data for creating the device profile, respectively, wherein a plurality of hatches, which are differentiated in color and density from each other, are arranged.

In the example illustrated in FIG. 5A, the chart image data D1 for creating the scanner profile is composed of image data for six pages, and the K plate amounts for the respective pages are 0, 20, 40, 60, 80, and 100%, respectively. With the image data for the page for which K plate amount is 0%, for example, the K value of 0% is applied to all patches in common, the image data being configured from a plurality of patches, which are composed of combinations of the K value and C, M, Y values in the range of 0-100% and differentiated in color and density from each other. Likewise, with the image data for the page for which K plate amount is 20%, the K value of 20% is applied to all patches in common, the image data being configured from a plurality of patches, which are composed of combinations of the K value and C, M, Y values in the range of 0-100% and differentiated in color and density from each other. This equally applies to the image data for the respective pages for which K plate amounts are 40, 60, 80, and 100%, respectively. Meanwhile, except for the K value, the C, M, Y values remain the same among the image data for all the six pages. Further, although in the example of FIG. 5A, the configuration is made from the image data for six pages in all with a step size of 20% in the range of 0-100%, a configuration with a step size of 10% (for this case, 11 pages in all) or with a different step size is also possible.

In the example illustrated in FIG. 5B, the chart image data D2 for creating the device profile is composed of image data for a single page, the image data being configured from a plurality of patches, which are composed of combinations of K values, for which the K plate amounts are 0, 20, 40, 60, 80, and 100%, and the C, M, Y values in the range of 0-100% in the single page, and different in color and density from each other. Although a specific description is omitted herein, the chart image data D3 for the registration chart may only be a chart comprised of a plurality of patches, which are arbitrary combinations of the C, M, Y, K values, and a chart for calibration and a chart for color management may be registered previously.

Returning to the description of FIG. 4, the storage unit 120 has stored therein data representative of information of the corresponding K value for each chart image data. For the chart image data as in FIG. 5A, for example, the K values for 1, 2, 3, 4, 5, and 6 pages are stored as 0, 20, 40, 60, 80, and 100%, respectively, while for the chart image data as in FIG. 5B, the K values for the respective regions in a page are stored as being mapped to the position information within the page.

Figure 6A:
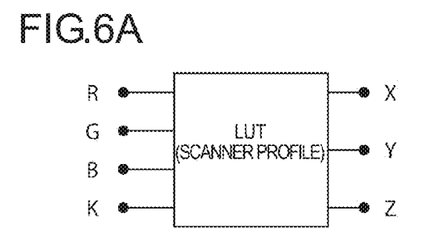
FIGS. 6A-6C are views for explaining respective profiles.
Figure 6B:
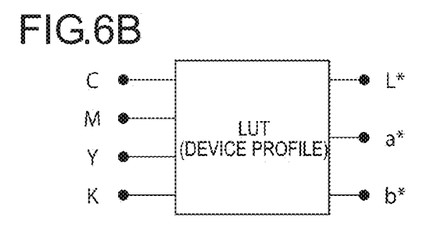
Figure 6C:
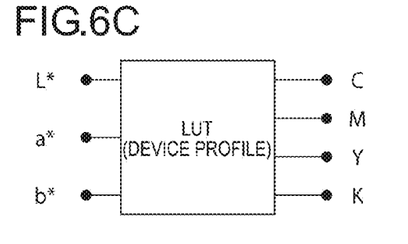

Further, the storage unit 120 has stored therein the scanner profile and the device profile. The scanner profile describes the characteristics of the scanner unit 270, and is a look-up table (LUT) for converting R, G, B, K input signals to CIE XYZ output signals, as shown in FIG. 6A, for example. The device profile is comprised of a LUT for converting C, M, Y, K input signals to L*a*b* output signals as shown in FIG. 6B, and a LUT for converting L*a*b* input signals to CMYK output signals as shown in FIG. 6C. While L*a*b* is used herein as the device-independent color space for the device profile, it is also possible that XYZ may be used as the device-independent color space. Methods for forming them will be described below, respectively.

<Method for Creating the Scanner Profile>

Figure 7:
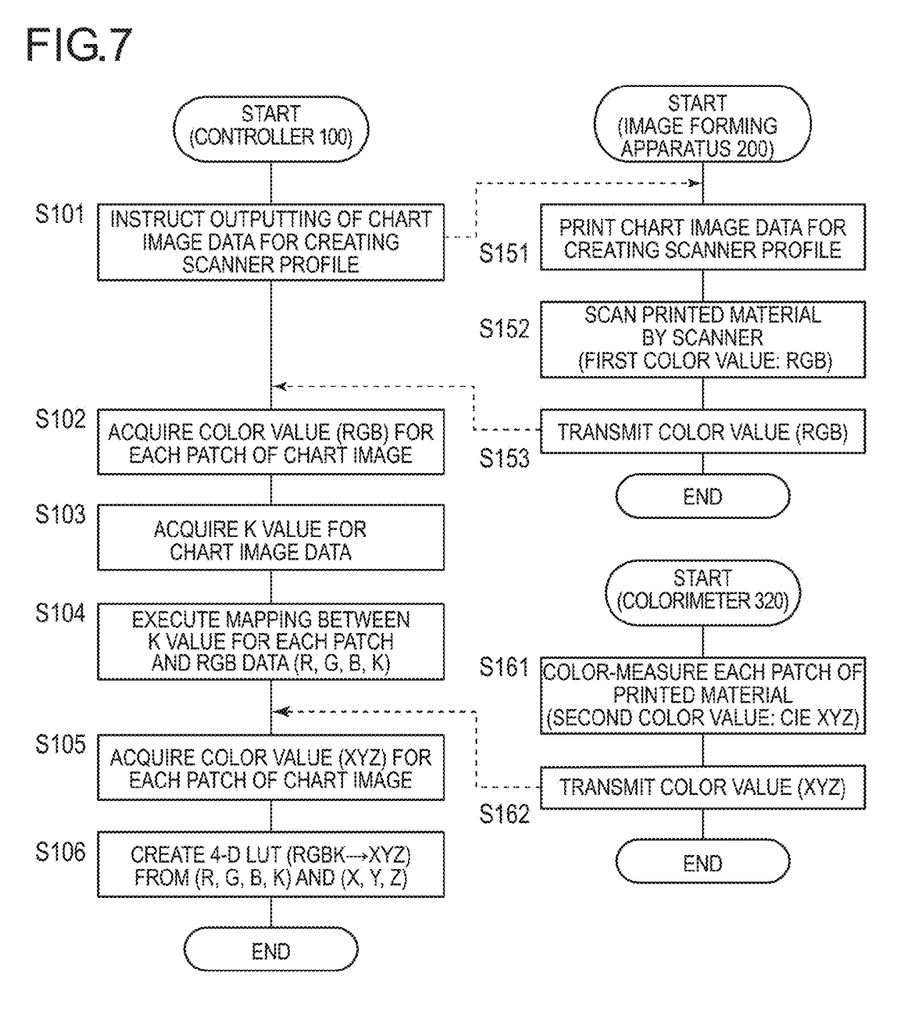
FIG. 7 is a control flow chart illustrating a method for creating a scanner profile.

FIG. 7 is a control flow chart illustrating a method for creating the scanner profile, which is performed by the printing system. More specifically, this is a method that is performed by the printing system using a program for creating the scanner profile.

First, the control unit 110 of the controller 100 makes an output instruction by transmitting to the image forming apparatus 200 via the network 400 the chart image data D1 for creating the scanner profile stored in the storage unit 120 or the print data (PDL) converted from the chart image data (S101).

Based on the output instruction from the controller 100, the control unit 210 of the image forming apparatus 200 causes the printing unit 260 to execute printing of the chart image data D1 including the plurality of patches, which are composed of the C, M, Y, K values and differentiated in control and density from each other. Thus, resulting plurality of sheets of printed material (in the example of FIG. 5A, six sheets) are read by the scanner unit 270 (S151, S152). Although herein the patches were arranged as being divided into a plurality of sheets, it is also possible that the patches may be arranged in a single sheet when the plurality of patches can fit in the single sheet.

Then, the control unit 210 transmits the RGB color value (first color value) for each of the resulting plurality of patch images to the controller 100 via the network 400 (S153).

The control unit 110 of the controller 100, which has received the color values for the respective patch images, acquires and causes the K values for the chart image data D1 from the storage unit 120 to be mapped to the color values (RGB) as received earlier, and performs this with respect to each patch (S102, S103, S104).

Meanwhile, the user performs, using the colorimeter 320, a color measurement with respect to the printed material obtained at the step S151, and acquires a color value for each patch image (S161). Further, the user operates the terminal 310 to transmit the acquired color value (second color value: CIE XYZ) to the controller 100 via the network 400 (S162). Further, without using the terminal 310, the user may store the data of the colorimeter 320 in a removable memory medium such as USB memory and couple the memory to the USB terminal of the controller 100 to perform a direct transfer of the color value data.

The control unit 110 of the controller 100 receives a color value from the colorimeter 320 (S105: a color value acquiring unit), creates a 4-dimensional LUT such as shown in FIG. 6A of the acquired color value for each patch and the data sets (R, G, B, K), which are mapped to each other at the step S104, and stores the LUT in the storage unit 120 (S106: a scanner profile creating unit).

Thereupon, the procedure is ended.

<Use 1 of the Scanner Profile (Calculation of the Color Value)>

Figure 8:
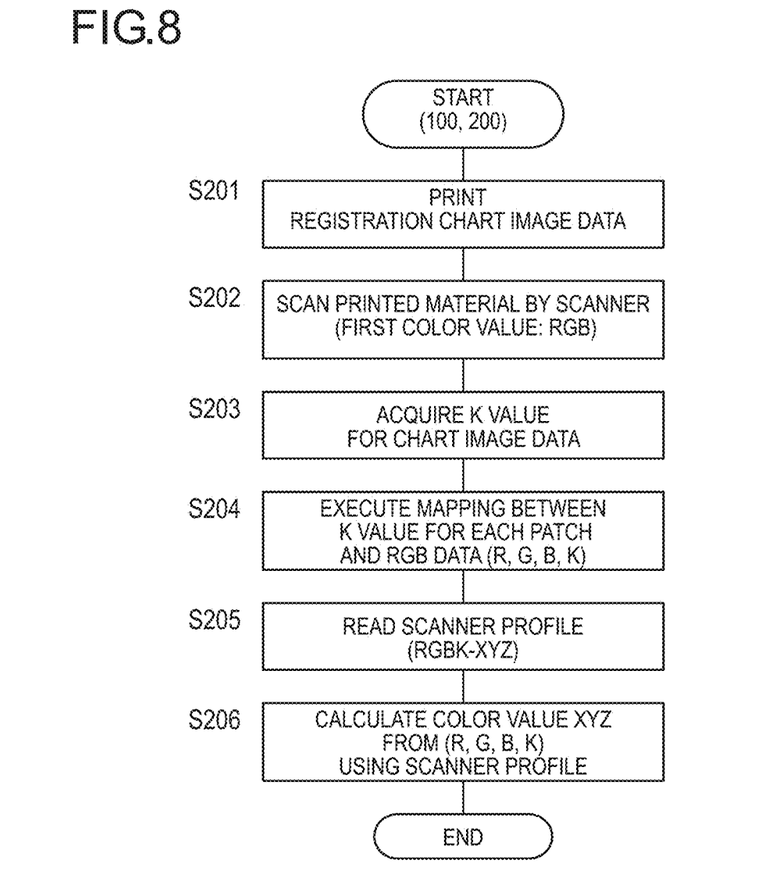
FIG. 8 is a control flow chart illustrating a method for acquiring a color value using the scanner profile.

Referring now to FIG. 8, it is described how to use the created scanner profile. FIG. 8 is a control flow chart illustrating a method for acquiring a color value using the scanner profile. The control unit 110 of the controller 100 serves, as a major component, to carry out the method in cooperation with the control unit 210 of the image forming apparatus 200.

First, the control unit 110 causes the printing unit 260 to execute printing based on the chart image data D3 of the registration chart which is stored in the storage unit 120 (S201). The registration chart as used herein is such that allows for a color measurement to acquire the color value (second color value) of the device-independent color space using the scanner profile in accordance with the present control flow, with the registration chart being previously registered with the controller 100. The registration can be made based on the user's instruction through the operation unit 140 and the display unit 150.

The resultant printed material is formed with a plurality of patch images, which are composed of arbitrary combinations of C, M, Y, K values. All the patch images may then be formed on a single sheet or otherwise may be formed over a plurality of sheets of paper.

Subsequently, the printed material thus printed is read by the scanner unit 270 to acquire RGB color values (S202). Then the K value for the chart image data D3 of the registration chart is read out of the memory unit 120 (S203) and mapped to the color value acquired at the step S202. This is conducted with respect to each of the patches (S204).

Further, the pre-stored scanner profile (RGBK-XYZ) is read out of the storage unit 120 (S205). This scanner profile is that created and stored in accordance with the control flow of FIG. 7. Using this, the CIE XYZ value, which is the color value of the device-independent color space, is calculated from the data sets (RGBK) mapped at the step S204 (S206: a color conversion unit), and thus the procedure is ended.

<Merit of Using K Plate Amount>

In the conventional technique, it has been the practice to convert the RGB color value read by the scanner to color value of a device-independent color space such as CIE XYZ or L*a*b* value, using a 3-dimensional LUT. However, it is difficult to convert RGB to XYZ at a high accuracy, and under a particular condition, it may sometimes be not possible to make a conversion on one-to-one basis. For example, two gray color patch images CMYK1 (CMYK=40, 35, 35, 0) and CMYK2 (CMYK=0, 0, 0, 50) are formed on a sheet, which are composed of three-color materials other than K and only of K color material, respectively. Further, when the images are color-measured by the scanner unit 270 and colorimeter 320, the color values acquired by the scanner unit 270 both represent RGB (70, 70, 70), while the color values acquired by the colorimeter 320 represent different values such as XYZ (25, 25, 25) for the image of CMYK1 and XYZ (25, 25, 28) for the image of CMYK2. The reason for this will be described with reference to the drawings.

Figure 9:
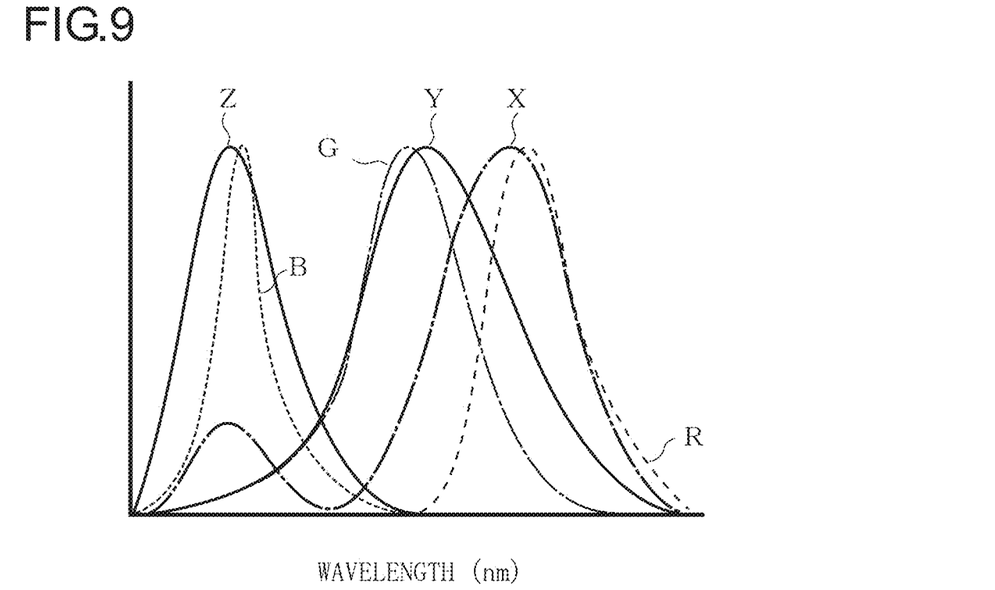
FIG. 9 is a view illustrating spectral sensitivity characteristics with respect to wavelength.

FIG. 9 is a view illustrating the spectral sensitivity characteristic of each of the R, G, B sensors of the scanner unit 270 and the color matching functions (the ratios of which are adjusted such that the vertical axis lengths are equal to each other), which are X, Y and Z filters, with the horizontal axis indicating wavelength (nm) and the vertical axis indicating the relative spectral sensitivity characteristic. As shown in FIG. 9, the waveforms do not coincide between the color matching function, which is X, Y and Z filter, and the R, G, B sensors.

Figure 10:
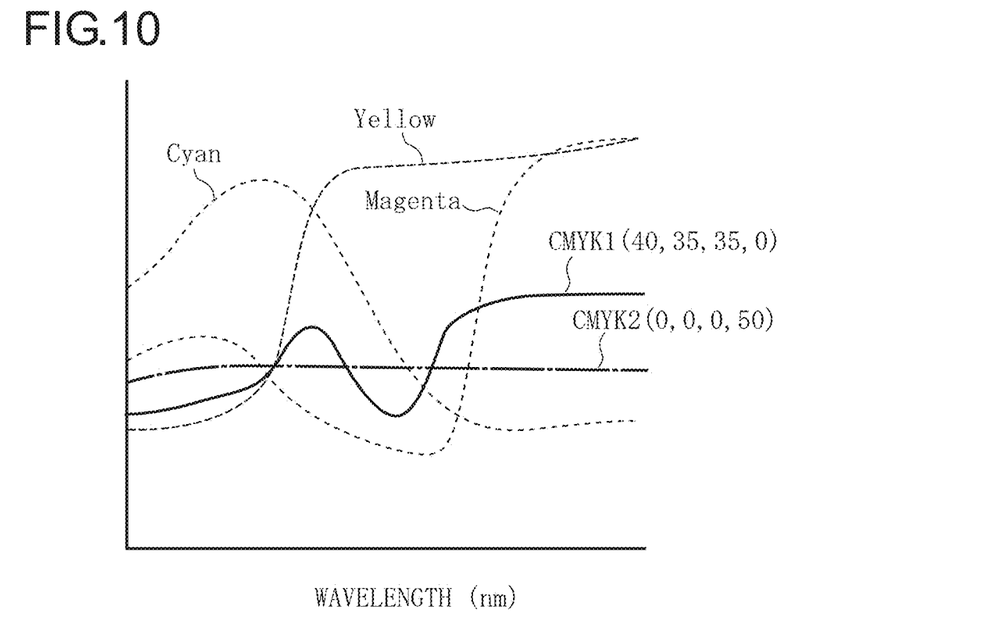
FIG. 10 is a view illustrating spectral reflectance factors with respect to wavelength.

FIG. 10 is a view illustrating the spectral reflectance factor, with horizontal axis indicating wavelength (nm) and the vertical axis indicating reflectance factor. In FIG. 10, two spectral distributions are illustrated for the patch image CMYK1 and the patch image CMYK2, respectively. The bracketed numerals in FIG. 10 represent, from left in order, the signal values for the C, M, Y, K image data; in CMYK1, the gray color is produced from three color materials of CMY except for K, and in CMYK2, the gray color is produced from a color material of K alone. Additionally, spectral distributions for the respective color materials of Cyan, Magenta, and Yellow are illustrated together for reference.

It can be understood from FIG. 10 that the waveforms of CMYK2, which are spectral distributions of the patch images formed from the color material of K alone, are relatively flat, whereas the waveforms of CMYK1 corresponding to the patch images formed from three color materials of CMY present concavo-convex shapes in correspondence to the wavelength distributions of the respective color materials.

Figure 11A:
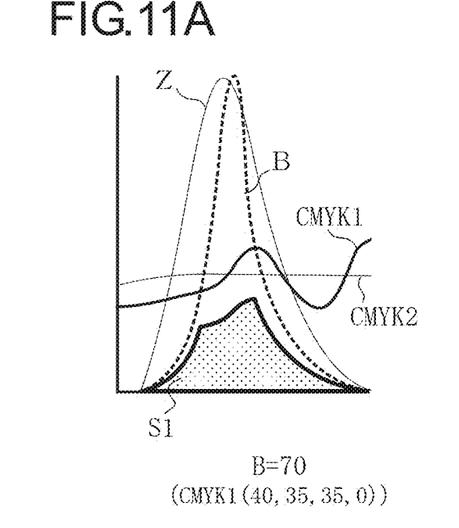
Figure 11B:
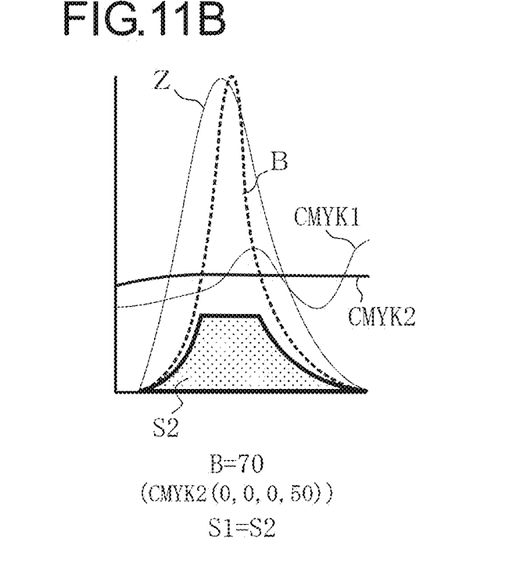
Figure 11C:
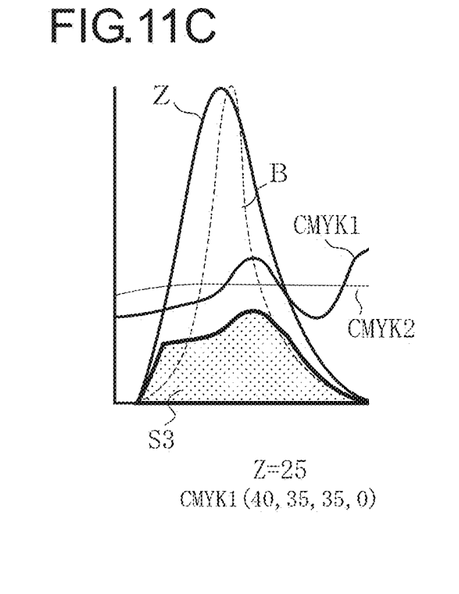
Figure 11D:
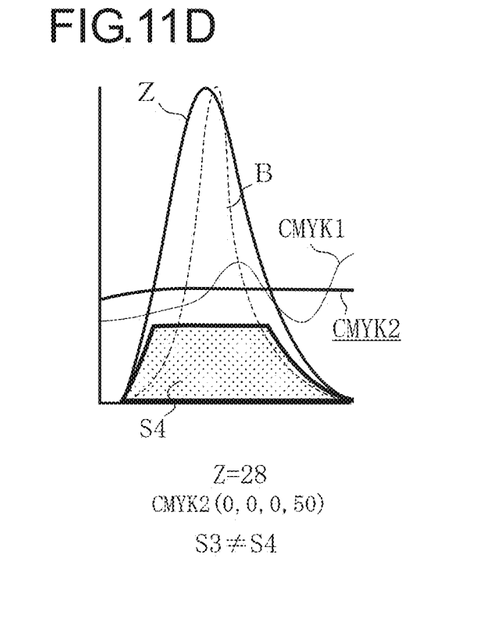

FIGS. 11A-11D are views in which the waveforms of FIGS. 9 and 10 are superimposed upon each other, and only the portions related to the B sensor of the scanner unit 270 and the color-matching function of the Z-filter are extracted. More specifically, FIG. 11A is a view for explaining the B color value for CMYK1, which is calculated through the B sensor of the scanner unit 270; FIG. 11B is a view for explaining the B color sensor for CMYK2, which is calculated through the B sensor of the scanner unit 270; FIG. 11C is a view for explaining the color value, or tristimulus value Z for CMYK1, which is calculated from the color matching function of the Z-filter; and FIG. 11D is a view for explaining the color value, or the tristimulus value Z for CMYK2, which is calculated from the color matching function of the Z-filter.

In FIGS. 11A and 11B, the hatched areas S1 and S2 represent the B color values that are calculated through the B sensor of the scanner unit 270. The areas can be determined by multiplying the spectral distribution for each wavelength with the sensitivity characteristic of the B sensor and integrating the multiplication. In FIGS. 11A and 11B, since area S1=area S2, the B color values both represent 70, i.e., are equal to each other.

Likewise in FIGS. 11C and 11D, the hatched areas S3 and S4 represent the color values, or the tristimulus values Z, which are calculated from the color matching function of the Z-filter. The areas can be determined by multiplying the spectral distribution for each wavelength with the sensitivity characteristic of the color matching function of the Z-filter and integrating the multiplication. In FIGS. 11C and 11D, the areas S3 and S4 are not equal to each other (S3≠S4), and thus the Z color values are different between the two cases, that is, the Z color value is 25 in FIG. 11C, and 28 in FIG. 11D.

Since, as in FIG. 10, the spectral distributions do not coincide between the patch images having different K plate amounts such as between CMYK1 (CMYK=40, 35, 35, 0) and CMYK2 (CMYK=0, 0, 0, 50), it may sometimes happen that the CIE XYZ color values from the colorimeter 320 are different from each other even if the RGB color values from the scanner unit 270 are the same.

Thus, in the present embodiment, the scanner profile is created from the RGB color value (the first color value of the device-dependent color space) acquired by reading the printed material of the chart image data by the scanner unit 270, the K value of the chart image data, and the CIE XYZ color value (the second color value of the device-independent color space) acquired by color-measuring the printed material by the colorimeter 320. The scanner profile describes the mapping relationship of the input signal to the color value of the device-independent color space, with an RGBK signal resulting from adding the K value signal of the image data to the RGB color value acquired from the scanner unit 270 being used as an input signal. Using such scanner profile, it is possible to calculate from the RGBK signal the color value of the device-independent color space at a high accuracy.

<Use 2 of the Scanner Profile (Creation of the Device Profile)>

Figure 12:
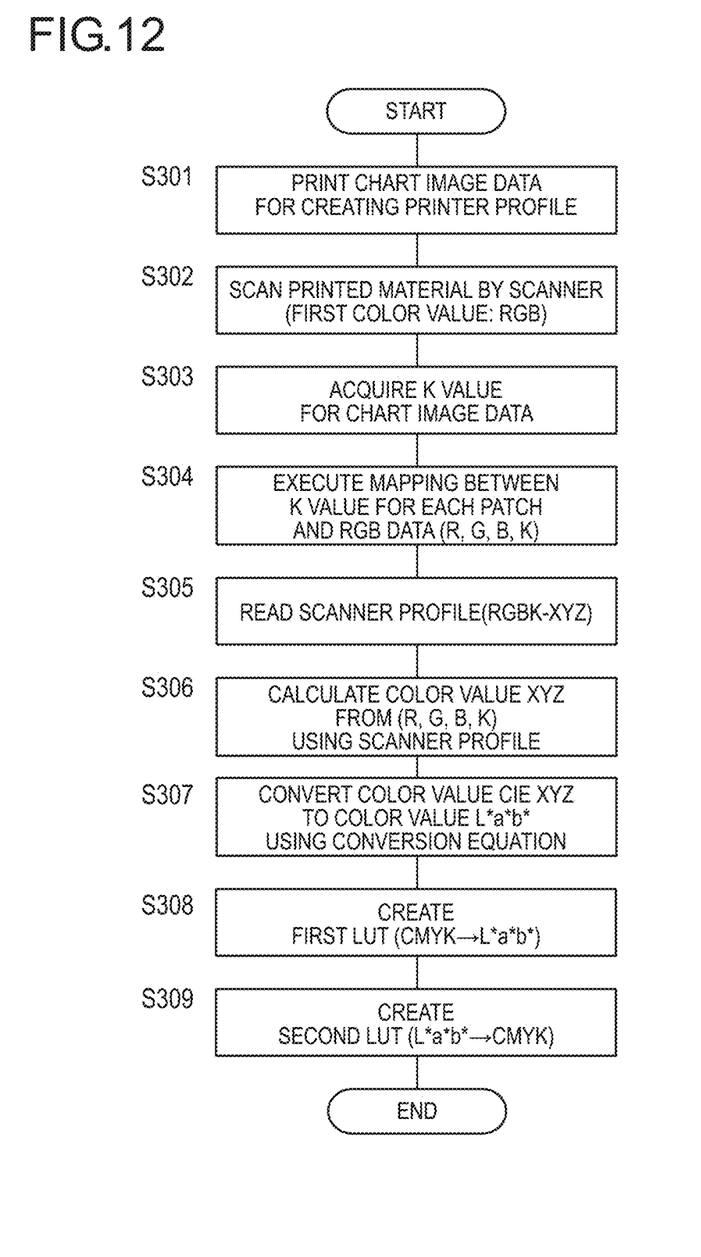
FIG. 12 is a control flow chart illustrating a method for creating a printer profile.

Referring then to FIG. 12, the method for creating the printer profile will be described hereinafter.

FIG. 12 is a control flow chart illustrating the method for creating the printer profile. In FIG. 12, the printing system is implemented using a program for creating the device profile. First, the control unit 110 of the controller 100 reads the chart image data D2 for creating the printer profile which is stored in the storage unit 120, and causes the print unit 260 of the image forming apparatus 200 to execute the printing (S301). As an example of the chart image for creating the printer profile, there is a color chart according to the ISO12642 standard (see FIG. 5B).

The resultant printed material is formed with a plurality of patch images, which are differentiated in color and density from each other by combining K plate amounts in a plurality of steps on a single sheet of paper as in FIG. 5B, for example. The printed material is read by the scanner unit 270 to acquire an RGB color value (S302). Subsequently, the K value for the chart image data D2, which is the original image data of the printed material, is read out of the storage unit 120 (S303), and mapped to the color value acquired at the step S302. This is performed with respect to each patch (S304).

The control unit 110 reads out of the storage unit 120 the scanner profile (RGBK-XYZ), which is pre-stored in the storage unit 120 (S305). This is the profile created in accordance with the control flow of FIG. 7. Using this, CIE XYZ, which is the color value of the device-independent color space, is calculated from the RGBK values mapped to each other at the step S304 (S306: the color conversion unit).

Subsequently, the XYZ color values acquired at the step S306 are converted to the L*a*b* values using the following known equations (S307):

$$L^* = 116 * \left(\frac{Y}{Yn}\right)^{1/3} - 16$$

$$a^* = 500\left(\left(\frac{X}{Xn}\right)^{1/3} - \left(\frac{Y}{Yn}\right)^{1/3}\right)$$

$$b^* = 200\left(\left(\frac{Y}{Yn}\right)^{1/3} - \left(\frac{Z}{Zn}\right)^{1/3}\right)$$

where Xn, Yn, and Zn are the tristimulus values of a perfect reflecting diffuser; Y/Yn>0.008856; X/Xn>0.008856; and Z/Zn>0.008856.

From the CMYK signal value for each of the plurality of patches of the chart image data D2 used for the printing at the step S302 and the L*a*b* values acquired through the conversion at the step S307, the control unit 110 creates a first look-up table (CMYK→LUT of L*a*b*)(see FIG. 6B) in which the L*a*b* values are described about input points for which the CMYK values are taken in the form of a four-dimensional lattice (S308). Subsequently, using the data of the first look-up table, the control unit 110 creates a second look-up table (L*a*b*→LUT of CMYK) (see FIG. 6C) in which the CMYK values are described about each of input points for which the L*a*b* values are taken in the form of a three-dimensional lattice (S309). This is stored in the storage unit 120, and the procedure is ended.

Using the thus pre-stored scanner profile, the printer profile can be created in which the CMYK and the color value of the device-independent color space are convertible to each other. If the scanner unit 270 and print unit 260 are available when creating the printer profile, then it is possible to create the printer profile without the use of the colorimeter 320. In this way, it is possible for the user to very easily create a highly accurate printer profile in which the CMYK and the color value of the device-independent color space are convertible to each other.

Although in the example of FIG. 12, the first and second LUTs were created after converting the CIE XYZ calculated through the use of the scanner profile to the L*a*b*, it is also possible that the conversion to the L*a*b* may be eliminated and an LUT for making conversion from CIE XYZ to CMYK or an LUT for making inverse conversion may be created.

Subsequently, the method for creating the device profile of a target device will be described with reference to FIG. 13.

Figure 13:
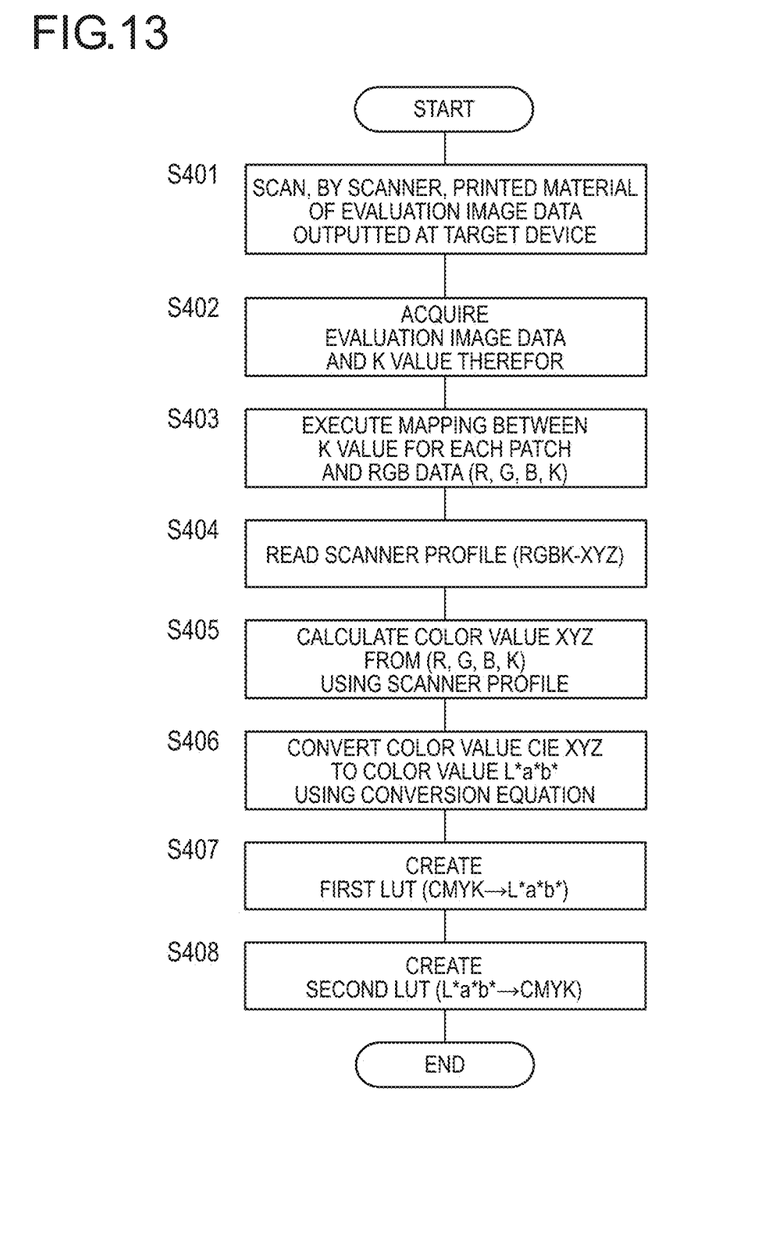
FIG. 13 is a control flow chart illustrating a method for creating a device profile of a target device.

FIG. 13 is a diagram illustrating a control flow that is executed mainly by the controller 100. First, based on the user's instruction, the control unit 110 causes the scanner unit 270 to read a printed material on which image data of a device profile evaluation chart is printed which has been outputted from the target device (S401). The target device is a device that meets the criteria of the standard specification and serves as a reference device or a device such as other printing machine or other printer. The target device may only be able to perform printing based on image data composed of CMYK color signals.

The printed material of the target device is not particularly limited, but may be a chart for creating the device profile such as being able to measure the colors over the entire color region of the target device. For example, it may be an ISO 12642 standard color chart such as shown in FIG. 5B. The control unit 110 acquires image data of the device profile evaluation chart, which is the original image data of the printed material. The image data may be obtained from a removable storage medium such as DVD, CD, USB memory or the like or via the network 400. The thus obtained image data is analyzed to acquire the K value (S402).

The control unit 110 makes the K value and the RGB color values obtained at the step S401 to be mapped to each color chart contained in the image data. This is performed for each patch (S403).

Subsequent steps S404-S408 correspond directly to the steps S305-S309 of FIG. 12, and a description thereof is omitted. Here again, as in FIG. 12, a first and a second LUT are created from CIE XYZ color signals calculated using the scanner profile stored in the storage unit 120.

By so doing, it is possible, using the scanner profile, to create the first LUT that describes the relationship of CIE XYZ to CMYK of the target device or the second LUT that describes the inverse relationship, without the use of the colorimeter 320.

Although the present invention has been described with reference to specific embodiments thereof, it is to be understood that the present invention is by no means limited to the embodiments described herein above.

Whereas, for example, in the embodiment of FIG. 1, the controller 100 and the image forming apparatus 200 have been described as independent entities, it is also possible that the functions of the controller 100 may be incorporated into the image forming apparatus 200.

Further, description has been made of the embodiment in which, by way of example, the scanner unit 270 is provided in the conveyance path along which a sheet is conveyed that is formed with an image internally of the image forming apparatus 200. Instead, the scanner unit may be provided with a platen glass, which is widely used with common photocopiers, and configured to be able to read a script sheet that is placed on the platen glass or conveyed by an ADF. In such a case, a mapping between the read printed material and the chart image data and each patch of the printed material can be achieved in accordance with the user's instruction or through recognition by the control unit of a characteristic image such as bar code printed on the printed material or a register mark.

Further, it is also possible that the printing unit 260 may be separated to configure an image reading system, which is equipped with the functions of the scanner unit 270 and controller 100, so that the control flow described above may be executed by the image reading system.

What is claimed is:

1. A method for generating a scanner profile using a scanner that reads an image to acquire a first color value of a device-dependent color space and a colorimeter that color-measures the image to acquire a second color value of a device-independent color space, the method comprising the steps of:
by reading, by the scanner, a printed material of chart image data including a plurality of patches which are composed of C, M, Y, K values and differentiated in color and density from each other, acquiring a first color value for the patches;
acquiring a K value for the patches of the chart image data;
acquiring a second color value for the patches by color-measuring the printed material by the colorimeter; and
creating the scanner profile describing a relationship of the second color value to the first color value and the K value based on the acquired first color value, K value and second color value for each of the plurality of patches.

2. A method for generating a device profile using the scanner profile generated according claim 1, the method comprising the steps of:
by reading, by the scanner, a printed material by the device of chart image data for creating the device profile including a plurality of patches which are composed of C, M, Y, K values and differentiated in color and density from each other, acquiring a first color value for the patches;
acquiring a K value for the patches of the chart image data for creating the device profile;
mapping the K value and the first color value to each other which are acquired for each of the plurality of patches;
calculating a second color value from the first color value and the K value, which are mapped to each other, using the scanner profile of the scanner; and
creating the device profile describing a relationship of the second color value to the C, M, Y, K values based on the C, M, Y, K values of the chart image data for creating the device profile of the printed material and the calculated second color value.

3. The method for generating the device profile according to claim 2, wherein the device is a printer that outputs the printed material based on the C, M, Y, K values.

4. The method for generating the device profile according to claim 2, wherein the device is a target device serving as a reference, the printed material is a reference chart, and the device profile is a device profile of the target device.

5. A method for acquiring a color value using the scanner profile generated according to claim 1, the method comprising the steps of:
acquiring the first color value by reading, by the scanner, the printed material of image data composed of C, M, Y, K values;
acquiring the K value for the image data of the printed material; and
calculating the second color value from the acquired first color value and the acquired K value using the scanner profile of the scanner.

6. An image reading system comprising:
a scanner that reads a printed material of chart image data including a plurality of patches which are composed of C, M, Y, K values and differentiated in color and density from each other, thereby acquiring a first color value of a device-dependent color space;
a storage unit that stores the K value for the patches of the chart image data;
a color value acquiring unit that color-measures the printed material by a colorimeter that outputs a second color value of a device-independent color space, thereby acquiring the second color value for the patches; and
a scanner profile creating unit that creates a scanner profile describing a relationship of the second color value to the first color value and the K value based on the K value, the first color value, and the second color value for each of the plurality of patches.

7. An image forming apparatus comprising:
a printing unit that performs printing based on chart image data including a plurality of patches which are composed of C, M, Y, K values and differentiated in color and density from each other, thereby outputting a printed material;
a scanner that reads the printed material of the chart image data outputted from the printing unit, thereby acquiring a first color value of a device-dependent color space;
a storage unit that stores the K value for the patches of the chart image data and the first color value acquired by reading the image of the patches, with the K value and the first color value being mapped to each other;
a color value acquiring unit that acquires the second color value for the patches by color-measuring the printed material by a colorimeter that outputs a second color value of a device-independent color space; and
a scanner profile creating unit that creates a scanner profile describing a relationship of the second color value to the first color value and the K value based on the K value, the first color value, and the second color value for each of the plurality of patches.

8. The image forming apparatus according to claim 7, further comprising:
a color conversion unit that calculates the second color value from the first color value for the patches acquired by reading, by the scanner and using the scanner profile, the printed material outputted from the print unit based on the chart image data including the plurality of patches which are composed of C, M, Y, K values and differentiated in color and density from each other, and the K value of the printer profile creating chart image data; and
a printer profile creating unit that creates a printer profile describing a relationship of the second color value to the C, M, Y, K values based on the C, M, Y, K values of the printer profile creating chart image data and the second color value calculated by the color conversion unit.

* * * * *